United States Patent [19]
Goedl

[11] 3,967,792
[45] July 6, 1976

[54] FLYCASTING REEL
[76] Inventor: Edmund V. Goedl, 773 John St., Teaneck, N.J. 07666
[22] Filed: Dec. 18, 1974
[21] Appl. No.: 533,927

[52] U.S. Cl............................................ 242/84.1 R
[51] Int. Cl.²....................................... A01K 89/00
[58] Field of Search................ 242/84.1 R, 84.51 R, 242/84.3

[56] References Cited
UNITED STATES PATENTS

| | | | |
|---|---|---|---|
| 969,235 | 9/1910 | Wollensak | 242/84.51 R |
| 1,189,232 | 7/1916 | Benjamin | 242/84.51 R |
| 2,633,308 | 3/1953 | Zientowski | 242/84.51 R |
| 3,510,083 | 5/1970 | Cook | 242/84.51 R |
| 3,721,399 | 3/1973 | Mroz | 242/84.51 R |
| 3,784,124 | 1/1974 | Shumate | 242/84.1 R |

Primary Examiner—Edward J. McCarthy
Attorney, Agent, or Firm—Hubbell, Cohen, Stiefel & Gross

[57] ABSTRACT

In a flycasting reel for use upon a fly rod, a pair of large diameter closely spaced apart reel heads or disc members are joined by a single common shaft extending between the disc members for enabling simultaneous rotational movement thereof with the shaft being a centrally located axial shaft. Only one of the disc members is rotatably mounted in a circumferential housing which housing includes means for mounting the reel to the fly rod. The axial shaft has a relatively small diameter compared to the disc diameter for enabling take-up and play-out of a slack line therefrom. The housing includes means for selectively enabling free rotatable movement of the disc members to fly cast the slack line.

5 Claims, 5 Drawing Figures

FLYCASTING REEL

BACKGROUND OF THE INVENTION

1. Field of the Invention

The present invention relates to flycasting reels for use upon a fly rod.

2. Description of the Prior Art

Fishing reels are well known and generally fall into two categories, one category being generally termed bait casting reels and the other category being generally termed flycasting reels. The problems present in each of these type of prior art fishing reels are unique as flycasting has long been recognized as an art requiring considerable skill separate and distinct from that required in bait casting. This uniqueness is typified by the fact that the conventional term fishing reel has normally been applied to bait casting reels as this is the more common type of reel in use today for fishing. The problems present in flycasting reels are not the same as those present in bait casting reels primarily because in a bait casting reel, such as disclosed in U.S. Pat. Nos. 2,120,190; 1,864,146; 975,653; 2,525,169; 1,452,808; 2,753,645; 2,002,403; and 3,447,254, the fisherman merely drops the fishing line overboard and reels it in when he believes he has a bite on the line. There is no slack line present with bait casting reels which can become entangled. However, in fly rod flycasting reels, wherein a slack line is normally utilized, such a slack line can become entangled in the cross ribs which are circumferentially provided between a pair of spaced apart reel heads or discs comprising the reel. Furthermore, in flycasting, it is desired to have an efficient reel structure of minimal bulk so that the reel may be easily manipulated on the fly rod to facilitate in the unique art of flycasting.

SUMMARY OF THE INVENTION

In a flycasting reel for use upon a fly rod, a pair of large diameter closely spaced apart reel heads or disc members are provided with the disc members having a minimal predetermined thickness solely dependent on the structural integrity of the material, such as brass, comprising the disc members. A single common shaft extends between and joins the disc members for enabling simultaneous rotational movement thereof, the shaft being a centrally located axial shaft. Only one of the disc members is rotatably mounted in a circumferential housing with the housing comprising means for mounting the reel to the fly rod guide means for the other disc member, with the guide means enabling rotatable movement of the other disc member therein. The other disc member comprises handle means for enabling rotational movement of the disc members. The axial shaft has a relatively small diameter compared to the disc diameter for enabling take-up and play-out of a slack line therefrom. The housing also includes means, such as a gear wheel and pinion, for selectively enabling free rotatable movement of the disc members to flycast the slack line.

DETAILED DESCRIPTION OF THE PREFERRED EMBODIMENT

Figure 1:
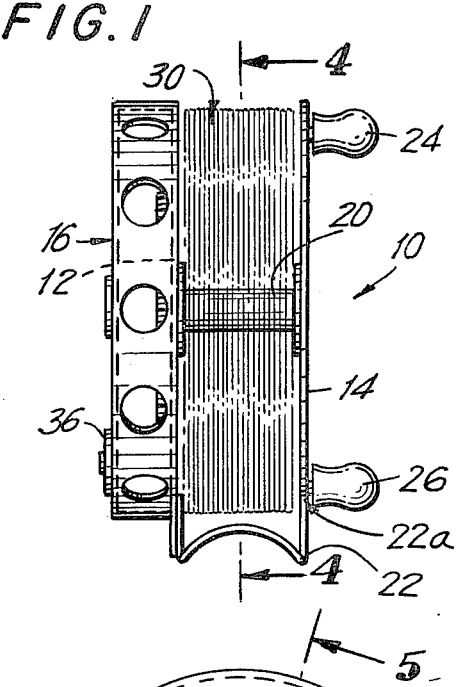
FIG. 1 is a front elevation of the preferred embodiment of the flycasting reel of the present invention.
Figure 5:
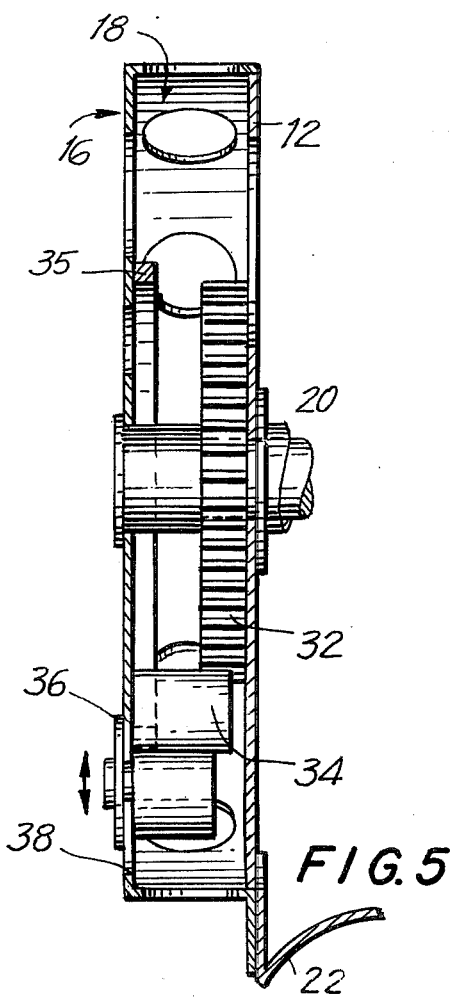
FIG. 5 is a fragmentary sectional view taken along line 5—5 of FIG. 3 of the embodiment shown in FIG. 1.

Referring now to the drawings in detail and initially to FIGS. 1 and 5 thereof, the flycasting reel of the present invention, generally referred to by the reference numeral 10, which is preferably for use upon a conventional fly rod (not shown), preferably comprises a pair of opposed spaced apart reel heads 12 and 14 forming part of the flycasting reel 10 framework. The flycasting reel framework 10 preferably includes a circumferential housing 16 which forms a chamber 18 in which reel head 12 is preferably mounted for rotational movement therein. Preferably, the reel heads 12 and 14 are substantially symmetrical and comprise large diameter discs, such as, preferably, by way of example, discs having a diameter of approximately 3 inches, which are closely spaced apart, such as by a distance of approximately one inch, by a single common shaft 20 extending between and joining the disc members or reel heads 12 and 14. The shaft 20 is preferably centrally located to join the reel heads or disc members 12 and 14 at the respective centers thereof and form an axial shaft 20 therebetween. The shaft 20 enables simultaneous rotational movement of the reel heads 12 and 14. The disc members or reel heads 12 and 14 preferably have a minimal predetermined thickness solely dependent on the structural integrity of the material comprising reel heads 12 and 14. This material is preferably a non-corrosive material, such as brass and, accordingly, the reel heads or disc members 12 and 14 preferably have a preferred thickness by 1/16 of an inch for a preferred disc diameter of 3 inches when the reel heads 12 and 14 are formed of brass.

Figure 2:
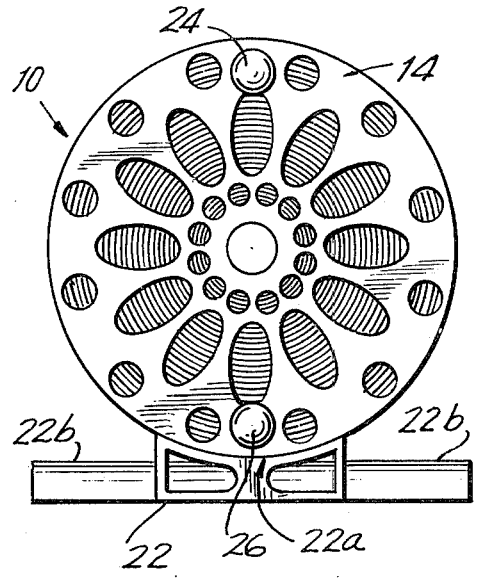
FIG. 2 is a side elevation from the right side of the embodiment shown in FIG. 1.

The housing 16 also preferably includes conventional means 22 for mounting the flycasting reel 10 to the fly rod (not shown). The conventional fly rod mounting means 22, as shown and preferred in FIG. 2, forms a guide 22a for reel head 14 which enables rotatable movement of reel head 14 within the guide portion 22a, the conventional mounting means 22 including a longitudinally extending curvilinear portion 22b for conventional mounting of the flycasting reel 10 on the fly rod. Reel head 14 also preferably includes conventional handles 24 and 26, preferably threaded to reel head 14 in conventional fashion for facilitating rotational movement of the joined reel heads 12 and 14. The common axial shaft 20 joining reel heads 12 and 14 preferably has a relatively small diameter compared to the disc diameter of reel heads 12 and 14, such as a preferred diameter of ½ 2 inch for a preferred disc diameter of three inches, by way of example, for enabling take-up and play-out of a slack line, generally shown by reference numeral 30 in FIG. 1, which is reeled upon shaft 20.

As shown and preferred in FIG. 5, chamber 18 of housing 16 preferably includes a conventional gear wheel 32 fixedly mounted to shaft 20 for simultaneous rotational movement therewith and a conventional pinion 34 mounted in chamber 18 for selective meshing with gear 32 when placed in engagement therewith. The selective engagement of pinion 34 with gear wheel 32 is preferably selectively controlled by means of a conventional switch 36 slidably mounted in slot 38.

Figure 3:
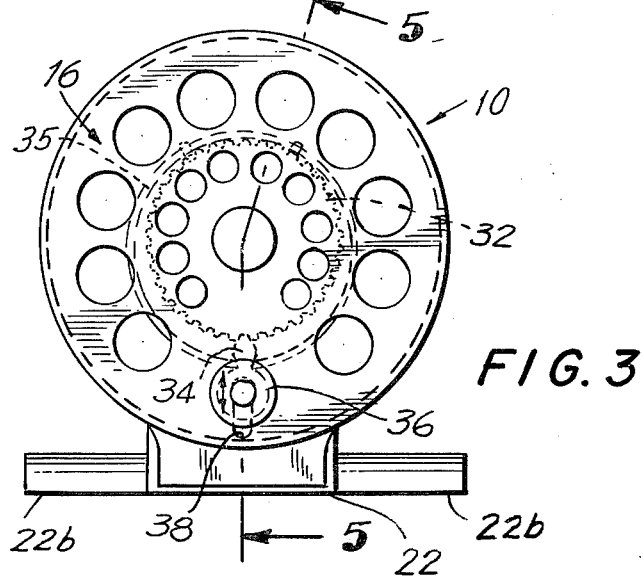
FIG. 3 is a side elevation from the left side of the embodiment shown in FIG. 1.

Switch 36 as shown and preferred in FIGS. 1, 3 and 5, may be moved vertically in the upward direction to engage pinion 34 in meshing relationship with gear wheel 32 and vertically in the downward direction to disengage pinion 34 from mashing relationship with gear wheel 32. Thus, pinion 34 in conjunction with gear wheel 32 and switch 36 which is mechanically linked to pinion 34, selectively enables free rotatable movement of the reel heads or disc members 12 and 14 to fly cast the slack line 30 when the pinion 34 is disengaged from gear wheel 32. When pinion 34 is engaged in meshing relationship with gear wheel 32, a conventional braking action is provided for the rotatable movement of the reel heads or disc members 12 and 14, such braking action preferably is desired to enable free running of the reel heads 12 and 14, the switch 36 is moved in the downward direction to disengage the pinion 34 from the gear wheel 32. As shown and preferred in FIGS. 1 through 5, the disc members and the housing 16 are conventionally provided with a plurality of apertures, although, if desired, such apertures may be omitted.

By employing the teachings of the present invention described above, an improved flycasting reel which enables easy manipulation and retrieving of the fly line or slack line while minimizing the possibility of entanglement of this slack line is provided.

Figure 4:
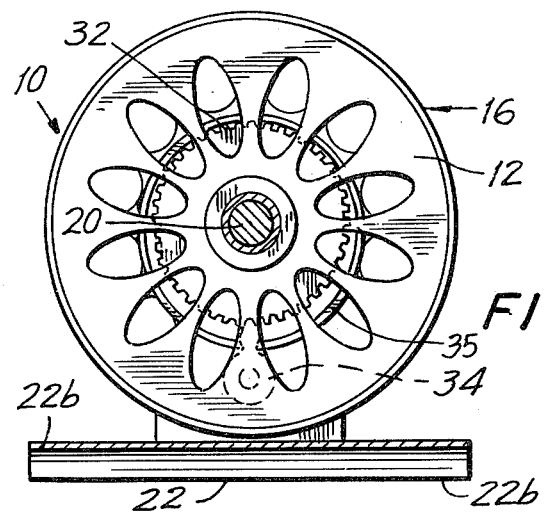
FIG. 4 is a fragmentary view taken along line 4—4 of FIG. 1 of the embodiment shown in FIG. 1.

As further shown and preferred in FIGS. 3, 4 and 5, pinion 34 is supported in meshing relationship with gear wheel 32 by means of a biasing ring 35 which is split at the point where pinion 34 extends through the biasing ring 35 (FIGS. 3 and 4). When pinion 34 is moved into meshing relationship with gear 32, the ends of split ring 35 are biased against the sides of the pinion 34 to yieldably hold it in position. When gear 32 is rotated by turning handle 24, the pinion 34 is momentarily moved our of engagement with a tooth of gear 32 and then biased into engagement with the next adjacent tooth by means of ring 35.

It is to be understood that the above described embodiment of the invention is merely illustrative of the principles thereof and that numerous modifications and embodiments of the invention may be derived within the spirit and scope thereof.

What is claimed is:

1. In a flycasting reel for use upon a fly rod a circumferential housing, a pair of large diameter closely spaced apart disc members, said disc members have a minimal predetermined thickness solely dependent on the structural integrity of the material comprising said disc members, a single common shaft extending between and joining said disc members for enabling simultaneous rotational movement thereof, said shaft being a centrally located axial shaft, only one of said disc members being rotatably mounted in said housing, said other disc member solely being supportably mounted in position on said axial shaft, said housing comprising means for mounting said reel to said fly rod, said fly rod mounting means including an arcuate segmental guide means beneath said other disc member and spaced therefrom for enabling rotatable movement of said other disc member thereabove while providing a vertical stop against vertical deflection of said other disc member, said other disc member comprising handle means for enabling rotational movement of said disc members on said common axial shaft, said axial shaft having a relatively small diameter compared to said disc diameter for enabling take-up and play-out of a slack line therefrom, and said housing further comprising means for selectively enabling free rotatable movement of said disc members to fly cast said slack line.

2. A fly casting reel in accordance with claim 1 wherein said selective free rotatable movement enabling means comprises gear wheel means operatively connected to said axial shaft for releasably braking rotatable movement of said disc members.

3. A fly casting reel in accordance with claim 2 wherein said selective free rotatable movement enabling means further comprises pinion means selectively engageable in meshing relationship with said gear wheel means for releasably braking said gear wheel means, and means for selectively disengaging said pinion means from said meshing relationship with said gear wheel means to selectively enable said free rotatable movement of said disc members to fly cast said slack line.

4. A flycasting reel in accordance with claim 1 wherein said disc members are composed of brass.

5. A flycasting reel in accordance with claim 4 wherein said disc members have a diameter of substantially 3 inches, said axial shaft has a diameter of substantially ½ inch and said disc members have a thickness of substantially 1/16 inch.

* * * * *

PO-1050 (5/69)

UNITED STATES PATENT OFFICE
CERTIFICATE OF CORRECTION

Patent No. 3,967,792     Dated July 6, 1976

Inventor(s) EDMUND V. GOEDL

It is certified that error appears in the above-identified patent and that said Letters Patent are hereby corrected as shown below:

Column 2, line 55: "1/2 2 inch" should read -- 1/2 inch --.

Column 3, line 37: "our of" should read -- out of --.

Signed and Sealed this

Fifth Day of October 1976

[SEAL]

Attest:

RUTH C. MASON
*Attesting Officer*

C. MARSHALL DANN
*Commissioner of Patents and Trademarks*